United States Patent [19]

Coran et al.

[11] 4,104,210

[45] Aug. 1, 1978

[54] THERMOPLASTIC COMPOSITIONS OF HIGH UNSATURATION DIENE RUBBER AND POLYOLEFIN RESIN

[75] Inventors: Aubert Y. Coran; Raman P. Patel, both of Akron, Ohio

[73] Assignee: Monsanto Company, St. Louis, Mo.

[21] Appl. No.: 641,547

[22] Filed: Dec. 17, 1975

[51] Int. Cl.² .................... C08L 7/00; C08L 23/00
[52] U.S. Cl. ........................ 260/4 R; 260/5; 260/888; 260/889; 260/897 A
[58] Field of Search ............ 260/889, 888, 4, 5, 260/897 A

[56] References Cited

U.S. PATENT DOCUMENTS

| | | | |
|---|---|---|---|
| 3,037,954 | 6/1962 | Gessler et al. | 260/29.8 |
| 3,073,797 | 1/1963 | Fischer et al. | 260/45.5 |
| 3,649,573 | 3/1972 | Yasui et al. | 260/5 |
| 3,665,059 | 5/1972 | Mahlman | 260/4 R X |
| 3,701,702 | 10/1972 | Shichman et al. | 260/4 R X |
| 3,758,643 | 9/1973 | Fischer | 260/897 A |
| 3,806,558 | 4/1974 | Fischer | 260/897 A |
| 3,821,158 | 6/1974 | Westermann et al. | 260/889 X |
| 3,912,685 | 10/1975 | Gintz | 260/889 X |
| 3,965,055 | 6/1976 | Shichman et al. | 260/4 R X |
| 4,005,054 | 1/1977 | Bonnefon et al. | 260/4 R X |

*Primary Examiner*—Thomas De Benedictis, Sr.
*Attorney, Agent, or Firm*—Larry R. Swaney

[57] ABSTRACT

Thermoplastic elastomeric compositions, comprising blends of high unsaturation diene rubber and thermoplastic olefin resin in which the rubber is cured, exhibit superior physical properties including improved toughness.

20 Claims, No Drawings

THERMOPLASTIC COMPOSITIONS OF HIGH UNSATURATION DIENE RUBBER AND POLYOLEFIN RESIN

This invention relates to thermoplastic compositions and, more particularly, to thermoplastic compositions comprising blends of polyolefin resin and cured diene rubber, and especially to elastomeric thermoplastic compositions.

BACKGROUND OF THE INVENTION

It is known that a blend of diene polymer rubber in which the rubber may be in major proportion and polyethylene can be vulcanized to give thermoset vulcanizates by conventional curing techniques. Gessler, who was one of the first to investigate dynamic curing, suggested that thermoplastic vulcanizates, useful whenever a high tensile strength semi-rigid plastic was required, could be prepared by the dynamic curing of a blend of 5–50 parts rubber and 95–50 parts polypropylene with curing agents which do not contain peroxide (Gessler — U.S. Pat. No. 3,037,954). However, the process was not demonstrated with highly unsaturated rubber, i.e., diene rubbers of high functionality. More recently, thermoplastic products have been prepared from blends of diene rubber of low functionality and polyolefin plastics in which the proportions could vary widely providing that the extent of cure was carefully controlled so as to effect only a partial cure (Fischer — U.S. Pat. Nos. 3,758,643 and 3,806,558). It is, of course, well known that diene rubbers of high functionality have a strong propensity to react with curatives to form thermoset products. In any event, the preparation of flexible thermoplastic tough elastic products comprising blends of diene rubbers of high functionality and polyolefin resins has not heretofore been accomplished.

SUMMARY OF THE INVENTION

There have now been discovered useful blends of polyolefin resin and vulcanized high unsaturation diene rubber characterized by a major proportion of such rubber. More particularly, it has been found that blends which comprise about 25–45 parts by weight of polyolefin resin and about 75–55 parts by weight of vulcanized high unsaturation diene rubber can be prepared which are both elastomeric and thermoplastic and further characterized by improved toughness as compared to similar compositions with lower or higher proportions of rubber. Preferred blends comprise about 60–70 parts by weight rubber per 100 parts by weight of resin and rubber combined. The indicated relative proportions of polyolefin resin and rubber are necessary to provide sufficient rubber to give tough elastomeric product and to provide sufficient resin to give a continuous resin phase and hence thermoplasticity. When the amount of rubber exceeds about 75 parts by weight per 100 parts by weight of resin and rubber combined, there is insufficient resin present to provide a continuous phase and the composition is not thermoplastic. When the quantity of rubber falls below about 55 parts by weight per 100 parts by weight resin and rubber combined, hard, rigid compositions having reduced toughness are obtained. The cured blends of the invention are envisaged as comprising microsized particles of cured rubber dispersed throughout a continuous resin matrix. Compositions of the invention are characterized by toughness, as represented by $TS^2/E$ wherein TS is tensile strength and E is Young's modulus, of at least 50% more than half of a composition containing similar ingredients but comprising equal proportions of resin and vulcanized rubber and further characterized by a Young's modulus of about 1750 Kg./cm$^2$ or less, preferredly, 1500 Kg./cm$^2$ or less. Improved toughness is an important property because it provides greater resistance to rupture or tear when an article is subjected to stress and strain. In general, the extent of vulcanization is not significant and it is neither necessary nor desirable to terminate the vulcanization reaction before it is complete. The new products are characterized by a tensile strength of 100% or more than that of the corresponding unvulcanized blends. It was unexpected that blends containing high proportions of cured high unsaturation diene rubber could be prepared in view of the propensity of such diene rubbers to scorch during processing.

As indicated, the thermoplastic elastomers of the invention are compositions in which the rubber portion of the blend is cured, i.e., the rubber is cross-linked to the extent that the rubber portion of the blend is essentially insoluble in the usual solvents. The procedure appropriate for evaluating state of cure depends upon the particular ingredients present in the blends. In this connection, essentially complete gelation of, say 96% or more is not always a necessary criterion of a fully cured product because of differences in molecular weight, molecular weight distribution and other variables among diene rubbers which influence the gel determination. Determination of the cross-link density of the rubber is an alternative means of determining state of cure of the vulcanizates but must be determined indirectly because the presence of the resin interferes with the determination. Accordingly, the same rubber as present in the blend is treated under conditions with respect to time, temperature, and amount of curative which result in a fully cured product as demonstrated by its cross-link density, and such cross-link density is assigned to the blend similarly treated. In general, a cross-link density of about $5 \times 10^{-5}$ or more moles (number of cross-links divided by Avogadro's number) per milliliter of rubber is representative of the values reported for fully cured high unsaturation diene rubber, however, this value may be as low as about $3 \times 10^{-5}$ especially in cases when reversion has occurred. An effect of curing the composition is the very substantial improvement in tensile strength which improvement directly relates to its practical uses. Surprisingly, such high strength elastomeric compositions are still thermoplastic as contrasted to thermoset elastomers.

Vulcanizable rubbers, although thermoplastic in the unvulcanized state, are normally classified as thermosets because they undergo the process of thermosetting to an unprocessable state. The products of the instant invention, although processable, are vulcanizates because they can be prepared from blends of rubber and resin which are treated with curatives in amounts and under time and temperature conditions known to give cured products from static cures of the rubber in molds and, indeed, the rubber has undergone gelation to the extent characteristic of an essentially complete state of cure. Thermosets are avoided in the compositions of the invention by simultaneously masticating and curing the blends. Thus, the thermoplastic compositions of the invention are preferredly prepared by blending a mixture of high unsaturation diene rubber, polyolefin resin, and curatives, then masticating the blend at vulcanization temperature until vulcanization is complete, using conventional masticating equipment, for example, Banbury mixer, Brabender Mixer, or certain mixing extruders. The resin and rubber are mixed at a temperature sufficient to soften the polyolefin resin or, more commonly, at a temperature above its melting poit if the resin is crystalline at ordinary temperatures. After the resin and rubber are intimately mixed, curative is added. Heating and masticating at vulcanization temperatures are generally adequate to complete the vulcanization reaction in a few minutes or less, but if shorter vulcanization times are desired, higher temperatures may be used. A suitable range of vulcanization temperatures is from about the melting temperature of the polyolefin resin (about 120° C in the case of polyethylene and about 175° C in the case of polypropylene) to 250° C or more; typically, the range is from about 150° C to 225° C. A preferred range of vulcanization temperatures is from about 180° to about 200° C. To obtain thermoplastic compositions, it is important that mixing continues without interruption until vulcanization occurs. If appreciable curing is allowed after mixing has stopped, a thermoset unprocessable composition may be obtained. A few simple experiments within the skill of the art utilizing available rubbers and curative systems will suffice to determine their applicability for the preparation of the improved products of this invention.

Methods other than the dynamic vulcanization of rubber/resin blends can be utilized to prepare compositions of the invention. For example, the rubber can be fully vulcanized in the absence of the resin, either dynamically or statically, powdered, and mixed with the resin at a temperature above the melting or softening point of the resin. Provided that the fully cured rubber particles are small, well dispersed and in an appropriate concentration, the compositions within the invention are easily obtained by blending fully cured rubber and resin. Accordingly, the term "blend" herein means a mixture comprising well dispersed small particles of vulcanized rubber. A mixture which is outside of the invention because it contains poorly dispersed or too large rubber particles can be comminuted by cold milling (to reduce particle size to below about $50\mu$) preferredly below $20\mu$ and more preferredly to below $5\mu$. After sufficient comminution or pulverization, a composition of the invention is obtained. Frequently, the case of poor dispersion or too large rubber particles is visibly obvious to the naked eye and observable in a molded sheet. This is especially true in the absence of pigments and fillers. In such a case, pulverization and remolding gives a sheet in which aggregates of rubber particles or large particles are not obvious or are far less obvious to the naked eye and mechanical properties are greatly improved.

The compositions of the invention are all processable in an internal mixer, to products which, upon transferring at temperatures above the softening or crystallizing points of the resin phases, to the rotating rolls of a rubber mill, form continuous sheets. The sheets are reprocessable in the internal mixer in which, upon reaching temperatures above the softening or melting points of the resin phases, are again transformed to the plastic state (molten state of the resin phase) but upon passing the molten product through the rolls of the rubber mill a continuous sheet again forms. In addition, a sheet of thermoplastic elastomeric composition of this invention can be cut into pieces and compression molded to give a single smooth sheet with complete knitting or fusion between the pieces. It is in the foregoing sense that "thermoplastic" will be herein understood. In addition, the thermoplastic elastomeric compositions of the invention are further processable to the extent that articles may be formed therefrom by extrusion or injection molding.

Where the determination of extractables is an appropriate measure of the state of cure, the improved thermoplastic elastomeric compositions are produced by vulcanizing the blends to the extent that the composition contains no more than about four percent by weight of rubber extractable at room temperature by a solvent which dissolves the uncured rubber, and preferably to the extent that the composition contains less than two percent by weight extractable. In general, the less extractables the better are the properties and still more preferable are compositions comprising essentially no extractable rubber (less than 0.5 weight percent). Gel content reported as percent gel is determined by the procedure of U.S. Pat. No. 3,203,937 which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber, such as extender oils, plasticizers and components of the resin soluble in organic solvent. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same diene rubber as in the blend statically cured under pressure in a mold with such amounts of the same curative as in the blend and under such conditions of time and temperature to give an effective cross-link density greater than about $3 \times 10^{-5}$ moles per milliliter of rubber and preferably greater than about $5 \times 10^{-5}$ or even more preferredly $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives with the rubber alone the aforesaid cross-link density that the curative does not react with the resin or that there is no reaction between the resin and rubber. There may be highly significant reactions involved but of limited extent. However, the assumption that the cross-link density determined as described provides a useful approximation of the cross-link density of the thermoplastic elastomeric compositions is consistent with the thermoplastic properties and with the fact that a large proportion of the resin can be removed from the composition by high temperature solvent extraction, for example, by boiling decalin extraction.

The cross-link density of the rubber is determined by equilibrium solvent swelling using the Flory-Rehner equation, *J. Rubber Chem. and Tech.*, 30, p. 929. The appropriate Huggins solubility parameters for rubber-solvent pairs used in the calculation were obtained from the review article by Sheehan and Bisio, *J. Rubber*

*Chem. & Tech.*, 39, 149. If the extracted gel content of the vulcanized rubber is low, it is necessary to use the correction of Bueche wherein the term $v_r^{\frac{1}{3}}$ is multiplied by the gel fraction (% gel/100). The cross-link density is half the effective network chain density $v$ determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

The term "high unsaturation rubber" as used herein and in the claims means an essentially random noncrystalline, rubbery homopolymer of a diolefin or copolymer in which the major component of the polymer chain is derived from a diolefin and includes both natural and synthetic rubber. High unsaturation diene rubbers contain a high proportion of ethylenic unsaturation within the chain. High unsaturation diene rubbers suitable for the practice of the invention comprise polymers of 1,3-butadiene and isoprene and their copolymers with vinyl arenes, such as styrene or vinyl pyridine, acrylonitrile, methacrylonitrile, isobutylene, acrylates and methacrylates. Commercially available high unsaturation diene rubbers suitable for the practice of the invention are described in Rubber World Blue Book, 1975 Edition, Materials and Compounding Ingredients for Rubber as follows: Natural Rubber, pages 389-394, Nitrile Rubber, pages 415-430, Polybutadiene Rubber, pages 431-432, Polyisoprenes, pages 439-440 and styrene butadiene rubbers, pages 452-460.

Suitable thermoplastic polyolefin resins comprise crystalline, high molecular weight solid products from the polymerization of one or more monoolefins by either high pressure or low pressure processes. Examples of such resins are the isotactic and syndiotactic monoolefin polymer resins, representative members of which are commercially available. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. Commercially available thermoplastic polyolefin resin, and preferably polyethylene or polypropylene, may be advantageously used in the practice of the invention, with polypropylene being preferred.

Moreover, the particular results obtained by the aforedescribed dynamic curing process are a function of the particular rubber curing system selected. The curatives and the curative systems conventionally used to vulcanize diene rubbers are utilizable for preparing the improved thermoplastics of the invention, but it appears that some curatives, particularly certain peroxides, if present, may degrade highly branched polyolefin resins such as polypropylene during dynamic curing to the extent that the desired results are not obtained. Any curative or curative system applicable for vulcanization of diene rubbers may be used in the practice of the invention, for example, peroxide, azide, quinoid or accelerated sulfur vulcanization systems. The combination of a maleimide and a peroxide or disulfide accelerator can be used. For satisfactory curatives and curative systems, reference is made to columns 3-4 of U.S. Pat. No. 3,806,558, which disclosure is incorporated herein by reference. Sufficient quantities of curatives are used to achieve essentially complete cure of the rubber as determined by the increase in tensile strength, by the cross-link density, by the sol content (percent extractables), or combination thereof. Excessive quantities of curatives should be avoided because quantities well beyond the amount necessary to fully cure the rubber can result in diminution of properties, for example, a reduction in ultimate elongation. Peroxide curatives are advantageously used in reduced quantities in conjunction with other curatives such as sulfur or bismaleimide providing the total amount of curatives is sufficient to vulcanize fully the rubber. High energy radiation is also utilizable as the curative means.

Curative systems comprising phenylene bis-maleimide, preferredly used with a peroxide activator, are especially recommended. Also, particularly recommended are efficient or semi-efficient sulfur curative systems which comprise high accelerator-sulfur ratios as contrasted with conventional sulfur curative systems wherein the amount of sulfur exceeds the amount of accelerator.

One aspect of the invention comprises adding a rubber antidegradant to the blend prior to dynamic vulcanization. The presence of a rubber antidegradant protects the blend from thermal and/or oxidative degradation resulting in compositions with superior properties. Preferredly, the rubber antidegradant is added early in the mixing cycle, and more preferredly, for greater effectiveness the antidegradant is masterbatched with the rubber and a portion of the rubber-antidegradant masterbatch is mixed with the resin. The resin then melts and after complete mixing, the composition is dynamically cured as described above. For suitable rubber antidegradants, refer to Rubber World Blue Book, supra, pages 107-140.

The properties of the thermoplastic compositions of this invention may be modified, either before or after vulcanization, by addition of ingredients which are conventional in the compounding of high unsaturation diene rubber, polyolefin resin and blends thereof. Examples of such ingredients include carbon black, silica, titanium dioxide, colored pigments, clay, zinc oxide, stearic acid, accelerators, vulcanizing agents, sulfur, stabilizers, antidegradants, processing aids, adhesives, tackifiers, plasticizers, wax, prevulcanization inhibitors, discontinuous fibers such as wood cellulose fibers and extender oils. The addition of carbon black, extender oil or both, preferably prior to dynamic vulcanization, are particularly recommended. Carbon black improves the tensile strength and extender oil can improve the resistance to oil swell, heat stability, hysteresis, cost and permanent set of the thermoplastic compositions. Aromatic, naphthenic and paraffinic extender oils can also improve processability. For suitable extender oils, refer to Rubber World Blue Book, supra, pages 145-190. The quantity of extender oil added depends upon the properties desired, with the upper limit depending upon the compatibility of the particular oil and blend ingredients which limit is exceeded when excessive exuding of extender oil occurs. Typically, 5-75 parts by weight extender oil and added per 100 parts by weight blend of diene rubber and polyolefin resin. Commonly about 10 to 60 parts by weight of extender oil are added per 100 parts by weight of rubber present in the blend with quantities of about 20 to 50 parts by weight of extender oil per 100 parts by weight of rubber being preferred. Typical additions of carbon black comprise about 20-100 parts by weight of carbon black per 100 parts by weight of diene rubber and usually about 25-60 parts by weight carbon black per 100 parts total weight of diene rubber and extender oil. The amount of carbon black which can be used depends, at least in part, upon the type of black and the amount of extender oil to be used. The amount of extender oil depends, at least in part, upon the type of rubber. High viscosity rubbers are more highly oil extendable. If nitrile rubber is used, polyvinylchloride-type plasticizers are commonly used in place of extender oils.

Thermoplastic elastomeric compositions of the invention are useful for making a variety of articles such as tires, hoses, belts, gaskets, moldings and molded parts. They are particularly useful for making articles by extrusion, injection molding and compression molding techniques. They also are useful for modifying thermoplastic resins, in particular, polyolefin resins. The compositions of the invention are blended with thermoplastic resins using conventional mixing equipment. The properties of the modified resin depend upon the amount of thermoplastic elastomeric composition. Generally the amount is such that the modified resin contains about 5 to 50 parts by weight of rubber per about 95 to 50 parts total weight of resin.

DESCRIPTION OF PREFERRED EMBODIMENTS

A typical procedure for the preparation of thermoplastic elastomeric compositions of the invention comprises mixing in the indicated proportions high unsaturation diene rubber and olefin resin in a Brabender mixer with an oil bath temperature as indicated for a time sufficient, usually between 2–6 minutes, to melt the resin and to form a uniform blend. Hereinafter mix temperature will be understood to be the temperature of the oil bath with the realization that the actual temperature of the mixture may vary. Curatives are added and mixing is continued until a maximum Brabender consistency is reached, usually between 1–5 minutes, and for an additional two minutes thereafter. The order of mixing can vary but all the ingredients should be added and mixing essentially complete before substantial vulcanization occurs. The vulcanized but thermoplastic composition is removed, sheeted on a mill (or sheeted by compression in a press), returned to the Brabender and mixed at the same temperature for two minutes. The material is again sheeted and then compression molded at 200°–250° C and cooled below 100° C under pressure before removal. Properties of the molded sheet are measured and recorded. The aforesaid procedure is followed in the examples below unless stated otherwise.

Ingredients used to illustrate the invention are N'-(1,3-dimethylbutyl)-N'-(phenyl)-p-phenylenediamine (Santoflex ® 13 antidegradant), Polymerized 1,2-dihydro-2,2,4-trimethylquinoline (Flectol ® H antidegradant), m-phenylene bis-maleimide (HVA-2), N-tert-butyl-2-benzothiazolesulfenamide (Santocure ® -NS accelerator), tetramethyl-thiuram disulfide (TMTD), 2-bis-benzothiazyl disulfide (MBTS); blow molding grade polyethylene, melt index 0.6 gm/10 min., sp.g. 0.960, ultimate elongation 600% (Polyethylene I); low flow, general purpose grade polypropylene sp.g. 0.902, tensile strength at yield 359 Kg./cm$^2$, 11% ultimate elongation (Polypropylene I); FDA grade polypropylene melt index 4 gm/10 min. sp.g. 0.905, tensile strength at yield 394 Kg./cm$^2$, + 100% ultimate elongation (Polypropylene II); tread grade polybutadiene rubber, high cis content, nonstaining, solution polymerized polybutadiene (butadiene rubber). All ingredients including resin and rubber shown in the Tables are in parts by weight.

An approximate toughness is calculated by an abbreviated Griffith equation $TS^2/E$ (TS= tensile strength, E=Young's modulus) assuming a linear relationship between tensile stress and extension. For a detailed analysis, refer to *Fracture,* Edited by H. Liebowitz, Published by Academic Press, New York 1972, Ch. 6, Fracture of Elastomers by A. N. Gent. The compositions are elastomeric, processable as thermoplastics and reprocessable without the need for reclaiming in contrast to ordinary thermoset vulcanizates. The term "elastomeric" as used herein and the claims means a composition which possesses the property of forcibly retracting after being greatly distorted. The degree of distortion which a composition can withstand to be properly classified as an elastomer has not been rigorously defined but, in general, is regarded to be at least 100%. Elastomer and Rubber are defined by ASTM Standards, V.28, p. 756 (D1566) as follows:

*Elastomer.* —Macromolecular material that returns rapidly to approximately the initial dimensions and shape after substantial deformation by a weak stress and release of the stress.

*Rubber.* —A material that is capable of recovering from large deformations quickly and forcibly, and can be, or already is, modified to a state in which it is essentially insoluble (but can swell) in boiling solvent, such as benzene, methyl ethyl ketone, and ethanol-toluene azeotrope.

A rubber in its modified state, free of diluents, retracts within 1 min to less than 1.5 times its original length after being stretched at room temperature (20 to 27C) to twice its length and held for 1 min before release.

Excepting that compositions of the invention are dispersible in solvents for the resin at high temperatures, the thermoplastic compositions of this invention may be properly regarded as elastomeric or rubbery because they meet either definition.

The data of Table I illustrate compositions of the invention comprising polyolefin resin and nature rubber. The natural rubber is Standard Malaysian Rubber, Grade 5. Stocks 1 and 4 are unvulcanized controls containing no curatives. Stock 2 illustrates the invention with polyethylene and an MBTS activated m-phenylene bis-maleimide cure system. Stock 5 illustrates the invention with polypropylene and an MBTS activated bis-maleimide cure system. Stock 7 illustrates the invention with a sulfur curative system. Stocks 3, 6 and 8 are vulcanized controls in which the blend comprises equal portions of polyolefin resin and natural rubber. All compositions contain one part by weight Flectol H and are prepared in accordance to the typical procedure described above using a Brabender mix speed of 100 rpm. The data show that the thermoplastic elastomeric compositions of the invention (Stocks 2, 5 and 7) exhibit substantially superior physical properties. For example, the tensile strength is improved 100% or more than the corresponding unvulcanized controls and the toughness, $TS^2/E$, is substantially increased compared to the vulcanized controls containing equal portions of resin and rubber.

TABLE I

|  | 1 | 2 | 3 | 4 | 5 | 6 | 7 | 8 |
|---|---|---|---|---|---|---|---|---|
| Natural rubber | 60 | 60 | 50 | 60 | 60 | 50 | 60 | 50 |

TABLE I-continued

|  | 1 | 2 | 3 | 4 | 5 | 6 | 7 | 8 |
|---|---|---|---|---|---|---|---|---|
| Polyethylene I | 40 | 40 | 50 | — | — | — | — | — |
| Polypropylene I | — | — | — | 40 | 40 | 50 | — | — |
| Polypropylene II | — | — | — | — | — | — | 40 | 50 |
| TMTD | — | — | — | — | — | — | 1.2 | 1.0 |
| MBTS | — | 1.0 | 0.83 | — | 0.9 | 0.75 | 0.6 | 0.5 |
| Zinc oxide | — | — | — | — | — | — | 3.0 | 2.5 |
| Stearic acid | — | — | — | — | — | — | 0.6 | 0.5 |
| Sulfur | — | — | — | — | — | — | 1.2 | 1.0 |
| HVA-2 | — | 5 | 4.17 | — | 4.5 | 3.75 | — | — |
| mix temp., °C | 180 | 182 | 180 | 180 | 180 | 180 | 180 | 180 |
| molding temp. °C | 200 | 220 | 220 | 225 | 220 | 220 | 220 | 220 |
| Ult. tensile strength, Kg./cm$^2$ | 73 | 186 | 198 | 59 | 181 | 212 | 135 | 156 |
| 100% modulus, Kg./cm$^2$ | 58 | 89 | 120 | 44 | 101 | 125 | 70 | 89 |
| Young's modulus, Kg./cm$^2$ | 585 | 616 | 1199 | 311 | 581 | 1283 | 528 | 1308 |
| Ult. elongation, % | 450 | 360 | 340 | 300 | 260 | 320 | 380 | 350 |
| (TS)$^2$/E, Kg./cm$^2$ | 9 | 56 | 33 | 11 | 56 | 35 | 35 | 19 |
| $\nu/2 \times 10^5$ | — | 5.2 | 5.2 | — | 5.1 | 5.1 | 3.9 | 3.9 |
| % gel | — | 96.3 | 96.3 | — | 96.6 | 96.6 | 96.2 | 96.2 |

Compositions of the invention comprising polyolefin resin and styrene-butadiene rubber are illustrated in Table II. The rubber is an emulsion copolymer of 1,3-butadiene and styrene prepared by cold polymerization, target bound styrene content of 23.5%, nominal Mooney viscosity 52. Compositions are prepared in a Brabender mixer as described above. Stocks 1 and 4 are vulcanized controls comprising blends of equal proportions of polyolefin resin and rubber. The data show that increasing the proportion of rubber results in tougher compositions as shown by the high values of TS$^2$/E and indicate that strong yet flexible compositions are obtained with both polyethylene and polypropylene.

TABLE II

|  | 1 | 2 | 3 | 4 | 5 | 6 |
|---|---|---|---|---|---|---|
| Styrene-butadiene rubber | 50 | 60 | 70 | 50 | 60 | 70 |
| Polyethylene I | 50 | 40 | 30 | — | — | — |
| Polypropylene I | — | — | — | 50 | 40 | 30 |
| Flectol H | 1.0 | 1.0 | 1.0 | 0.5 | 0.5 | 0.6 |
| MBTS | 1.0 | 1.2 | 1.4 | — | — | — |
| HVA-2 | 2.5 | 3.0 | 3.5 | 4.17 | 5.0 | 5.0 |
| mix speed, rpm | 100 | 100 | 100 | 100 | 100 | 100 |
| mix temp., °C | 180 | 180 | 180 | 180 | 182 | 182 |
| molding temp., °C | 220 | 220 | 220 | 220 | 220 | 220 |
| Ult. tensile strength, Kg./cm$^2$ | 191 | 174 | 147 | 209 | 200 | 141 |
| 100% modulus, Kg./cm$^2$ | 130 | 108 | 87 | 106 | 153 | 117 |
| Young's modulus, Kg./cm$^2$ | 1629 | 854 | 394 | 1733 | 1081 | 596 |
| Ult. elongation, % | 290 | 240 | 200 | 230 | 150 | 130 |
| (TS)$^2$/E, Kg./cm$^2$ | 22 | 35 | 55 | 25 | 37 | 33 |
| $\nu/2 \times 10^5$ | 14 | 14 | 14 | 7.3 | 7.3 | 7.1 |
| % gel | >98 | >98 | >98 | >98 | >98 | >98 |

Compositions of the invention (Stocks 4, 5 and 6) comprising polypropylene and polybutadiene rubber are illustrated in Table III. Stocks 1 and 3 are unvulcanized controls comprising blends containing no curatives. Stocks 2 and 4 illustrate compositions prepared using peroxide activated m-phenylene-bis-maleimide cure system comprising the indicated parts by weight polybutadiene rubber and polypropylene. Stock 2 is a vulcanized control containing equal proportions of resin and rubber. The data show that a substantial increase in tensile strength is obtained in the blends containing cured rubber and that the blend containing high proportion of rubber is tougher. Stocks 5 and 6 illustrate the effect of mix temperature on the physical properties of the vulcanizates of the invention. Increasing mix temperature from 185° C to 225° C results in increases in both tensile strength and Young's modulus but a reduction in ultimate elongation, however, the toughness is unchanged.

TABLE III

|  | 1 | 2 | 3 | 4 | 5 | 6 |
|---|---|---|---|---|---|---|
| Butadiene rubber | 50 | 50 | 60 | 60 | 62.5 | 62.5 |
| Polypropylene II | 50 | 50 | 40 | 40 | 37.5 | 37.5 |
| Flectol H | 1 | 1 | 1 | 1 | — | — |
| Santoflex 13 | — | — | — | — | 1.9 | 1.9 |
| HVA-2 | — | 1.5 | — | 1.8 | 4.85 | 4.85 |
| Peroxide* | — | 0.25 | — | 0.3 | — | — |
| mix speed, rpm | 100 | 100 | 100 | 100 | 80 | 80 |
| mix temp., °C | 180 | 180 | 180 | 180 | 185 | 225 |
| mold temp., °C | 220 | 220 | 220 | 220 | 250 | 225 |
| Ult. tensile strength, Kg./cm$^2$ | 66 | 160 | 44 | 153 | 144 | 170 |
| 100% modulus, Kg./cm$^2$ | — | 141 | — | 116 | 100 | 134 |
| Young's modulus, Kg./cm$^2$ | 1787 | 2018 | 658 | 1146 | 844 | 1146 |
| Ult. elongation, % | 30 | 170 | 80 | 200 | 240 | 170 |
| (TS)$^2$/E, Kg./cm$^2$ | 2 | 13 | 3 | 20 | 25 | 25 |
| Shore D, hardness | — | — | — | — | 41 | 43 |

*2,5-dimethyl-2,5 di(t-butylperoxy)hexane (90% assay)

Sulfur-cured compositions of the invention comprising polybutadiene rubber and polypropylene are illustrated in Table IV. The data show the effect of curative level on properties. The amount of curative is varied while keeping the sulfur-accelerator ratio constant. Stock 1 indicates that 0.6 parts by weight sulfur per 100 parts by weight rubber is sufficient to give a composition exhibiting respectable physical properties. The data of Stocks 2 and 3 indicate that the ultimate tensile strength and toughness of the compositions are improved when 1.2-2.4 parts by weight sulfur per 100 parts by weight rubber are used. The data of Stock 4 indicate that at very high sulfur levels, the physical properties deteriorate with ultimate elongation being especially adversely affected.

TABLE IV

|  | 1 | 2 | 3 | 4 |
|---|---|---|---|---|
| Butadiene rubber | 62.5 | 62.5 | 62.5 | 62.5 |
| Polypropylene II | 37.5 | 37.5 | 37.5 | 37.5 |
| Santoflex 13 | 1.9 | 1.9 | 1.9 | 1.9 |
| Zinc oxide | 4 | 4 | 4 | 4 |
| Stearic acid | 2 | 2 | 2 | 2 |
| Santocure-NS | 0.64 | 1.25 | 2.5 | 5 |
| Sulfur | 0.38 | 0.75 | 1.5 | 3 |
| mix speed, rpm | 80 | 80 | 80 | 80 |
| mix temp., °C | 185 | 185 | 185 | 185 |
| mold temp., °C | 225 | 225 | 225 | 225 |
| Ult. tensile strength, Kg./cm$^2$ | 93 | 110 | 118 | 72 |
| 100% modulus, Kg./cm$^2$ | 84 | 88 | 106 | — |
| Young's modulus, Kg./cm$^2$ | 932 | 784 | 925 | 1007 |
| Ult. elongation, % | 160 | 220 | 150 | 40 |
| (TS)$^2$/E, Kg./cm$^2$ | 9 | 15 | 15 | 5 |
| Shore D, hardness | 31 | 37 | 39 | 39 |

TABLE V

|  | 1 | 2 | 3 | 4 | 5 | 6 | 7 | 8 | 9 |
|---|---|---|---|---|---|---|---|---|---|
| Butadiene rubber | 30 | 40 | 50 | 55 | 60 | 65 | 70 | 75 | 80 |
| Polypropylene I | 70 | 60 | 50 | 45 | 40 | 35 | 30 | 25 | 20 |
| Flectol H | 1 | 1 | 1 | 1 | 1 | 1 | 1 | 1 | 1 |

TABLE V-continued

|  | 1 | 2 | 3 | 4 | 5 | 6 | 7 | 8 | 9 |
|---|---|---|---|---|---|---|---|---|---|
| HVA-2 | 2.5 | 3.3 | 4.2 | 4.6 | 5.0 | 5.5 | 5.8 | 5.0 | 2.4 |
| mix speed, rpm | 80 | 80 | 80 | 80 | 80 | 80 | 80 | 80 | 80 |
| mix temp., °C | 200 | 200 | 200 | 200 | 200 | 200 | 200 | 200 | 200 |
| mold temp., °C | 220 | 220 | 220 | 220 | 220 | 220 | 220 | 220 | 220 |
| Ult. tensile strength, Kg./cm$^2$ | 295 | 260 | 212 | 224 | 212 | 196 | 151 | 96.3 | 23.9 |
| 100% modulus, Kg./cm$^2$ | 195 | 175 | 144 | 133 | 125 | 114 | 92.1 | 68.2 | — |
| Young's modulus, Kg./cm$^2$ | 3910 | 2960 | 1980 | 1440 | 1200 | 741 | 439 | 202 | 40.1 |
| Ult. Elongation, % | 420 | 330 | 250 | 280 | 260 | 230 | 190 | 150 | 90 |
| (TS)$^2$/E, Kg./cm$^2$ | 22 | 23 | 23 | 35 | 37 | 52 | 52 | 46 | 14 |
| % stretch at 185° C | ∞ | ∞ | 13 | 1 | 2 | 6 | 0 | −3 | −10 |

A study of the effect of the relative proportions of polybutadiene rubber and resin is shown in Table V. In stocks 1–7, the amount of curative is equal to 8.4 ± 0.1 parts per 100 parts of rubber which amount of curative gives a cross-link density of about $11 \times 10^{-5}$ mole per ml and a gel content of about 97 percent. The amount of curative is reduced somewhat in Stocks 8 and 9 to avoid scorching, the amount being sufficient to give a cross-link density of $9 \times 10^{-5}$ or more and a gel content of about 97 percent. Stocks 4 through 8 illustrate compositions of the invention. These stocks exhibit superior toughness as shown by the high values of (TS)$^2$/E and exhibit excellent dimensional stability at high temperature as shown by the low percent stretch values at 185° C. The percent stretch is determined by placing a specimen of known cross-sectional area at a constant load of 230g./cm$^2$ in an oven at 185° C. After five minutes, the specimen is removed, cooled under stress, and the cross-sectional area determined, the percent stretch is calculated from the change in cross-sectional area. Negative values indicate shrinkage and infinity indicates the specimen stretch until reaching the bottom of the oven (>100% stretch). Stocks 1–3 with high proportions of resin exhibit low toughness and high rigidity as shown by the high Young's modulus. Stock 9 illustrates that when the proportion of rubber becomes too high, low tensile strength, low elongation, low toughness and rather poor dimensional stability at high temperture result.

Another study of the effect of the relative proportions of polybutadiene rubber and resin is shown in Table VI. In this study, the amount of curative is kept constant in respect to the total weight of resin and rubber combined, however, the amount is always sufficient to give a cross-link density of at least $9.5 \times 10^{-5}$ moles per ml. Stocks 2 and 3 illustrate compositions of the invention. Stock 1 containing a high proportion of rubber partially scorched while being prepared and exhibits significantly reduced physical properties. Stocks 2 and 3 illustrate compositions containing preferred proportions of rubber and resin which compositions exhibit an excellent combination of properties. Stock 4 illustrating a composition outside of the invention shows that when the proportion of resin becomes too high that inflexible rigid compositions are obtained as shown by the high Young's modulus.

TABLE VI

|  | 1 | 2 | 3 | 4 |
|---|---|---|---|---|
| Butadiene rubber | 80 | 70 | 60 | 50 |
| Polypropylene II | 20 | 30 | 40 | 50 |
| Santoflex 13 | 2.4 | 2.0 | 1.8 | 1.5 |
| HVA-2 | 2.5 | 2.5 | 2.5 | 2.5 |
| mix speed, rpm | 80 | 80 | 80 | 80 |
| mix temp., °C | 225 | 225 | 225 | 225 |
| v/2 × 10$^5$ | 9.5 | 10 | 10 | 10 |
| mold temp., °C | 225 | 225 | 225 | 225 |
| Ult. tensile strength, Kg./cm$^2$ | 42 | 117 | 163 | 166 |
| 100% modulus, Kg./cm$^2$ | — | 89 | 112 | 133 |
| Young's modulus, Kg./cm$^2$ | 104 | 510 | 999 | 1898 |
| Ult. elongation, % | 80 | 170 | 230 | 220 |
| (TS)$^2$/E, Kg./cm$^2$ | 17 | 27 | 27 | 15 |

Compositions of the invention are further illustrated in Table VII. Stocks 1–3 illustrate compositions of the invention prepared with different cure systems. Stock 1 shows the preparation of a composition using tetramethyl thiuram disulfide accelerator alone, whereas, Stock 2 shows that the addition of sulfur results in a composition exhibiting substantially improved properties. Stock 3 shows a high strength composition cured with m-phenylene bis-maleimide. Stock 4 is a control comprising an unvulcanized blend of polybutadiene rubber and polyethylene. Stocks 5 and 6 illustrate the blend of Stock 4 vulcanized with a sulfur cure system and m-phenylene bis-maleimide, respectively. The data show that compositions of the invention exhibit substantially superior properties compared to the unvulcanized blend with a two or more times improvement in tensile strength and elongation. Stocks 2 and 5 indicate that sulfur cure systems give compositions with higher ultimate elongations. Stocks 3 and 6 indicate that m-phenylene bis-maleimide cure gives compositions with higher tensile strengths.

TABLE VII

|  | 1 | 2 | 3 | 4 | 5 | 6 |
|---|---|---|---|---|---|---|
| Butadiene rubber | 60 | 60 | 60 | 60 | 60 | 60 |
| Polypropylene I | 40 | 40 | 40 | — | — | — |
| Polyethylene I | — | — | — | 40 | 40 | 40 |
| Flectol H | 0.5 | 0.5 | 0.5 | 1 | 1 | 1 |
| TMTD | 1.8 | 1.8 | — | — | 1.2 | — |
| Sulfur | — | 0.9 | — | — | 0.6 | — |
| Zinc oxide | — | — | — | — | 3 | — |
| Stearic acid | — | — | — | — | 0.6 | — |
| MBTS | — | — | — | — | 0.3 | — |
| HVA-2 | — | — | 5 | — | — | 5 |
| mix speed, rpm | 100 | 100 | 100 | 100 | 100 | 100 |
| mix temp., °C | 180 | 180 | 180 | 182 | 182 | 182 |
| mold temp., °C | 220 | 220 | 220 | 220 | 220 | 220 |
| Ult. tensile strength, Kg./cm$^2$ | 79 | 120 | 207 | 46 | 126 | 197 |
| 100% modulus, Kg./cm$^2$ | 66 | 69 | 133 | — | 80 | 133 |
| Young's modulus, Kg../cm$^2$ | 544 | 671 | 889 | 385 | 574 | 850 |
| Ult. elongation, % | 200 | 400 | 230 | 50 | 310 | 230 |
| (TS)$^2$/E, Kg./cm$^2$ | 11 | 21 | 48 | 5 | 28 | 46 |

A composition of the invention comprising nitrile rubber and polyethylene is illustrated in Table VIII.

The nitrile rubber is a low acrylonitrile butadiene-acrylonitrile copolymer containing a nonstaining antioxidant, sp.g. 0.95, Mooney viscosity 80 (ML-4 at 100° C). Stock 1, an unvulcanized control, comprises a blend containing unvulcanized rubber. Stock 2 illustrates an elastomeric thermoplastic composition of the invention in which the rubber is cured with an activated bis-maleimide cure system. Stock 3, a vulcanized control, comprises a 50/50 rubber-resin blend. The data show that the composition of Stock 2 possesses substantially improved properties, especially, improved toughness.

TABLE VIII

|  | 1 | 2 | 3 |
|---|---|---|---|
| Nitrile rubber | 60 | 60 | 50 |
| Polyethylene I | 40 | 40 | 50 |
| Flectol H | 0.55 | 0.55 | 0.55 |
| MBTS | — | 1.8 | 1.5 |
| HVA-2 | — | 4.5 | 3.75 |
| mix speed, rpm | 100 | 100 | 100 |
| mix temp., ° C | 180 | 180 | 180 |
| mold temp., ° C | 200 | 220 | 220 |
| Ult. tensile strength, Kg./cm$^2$ | 63 | 179 | 165 |
| 100% modulus, Kg./cm$^2$ | — | 141 | 146 |
| Young's modulus, Kg./cm$^2$ | 680 | 1535 | 2376 |
| Ult. elongation, % | 100 | 190 | 150 |
| (TS)$^2$/E, Kg./cm$^2$ | 6 | 21 | 11 |
| $\nu/2 \times 10^5$ | — | 33 | 33 |
| % gel | — | 98.4 | 98.4 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are as follows:

1. An elastomeric thermoplastic composition comprising a blend of about 25–45 parts by weight of crystalline thermoplastic polyolefin resin and about 75–55 parts by weight of vulcanized high unsaturation diene rubber particles of a size below about 50 microns dispersed throughout said resin per 100 total parts by weight of resin and rubber, which rubber is a homopolymer of a diolefin or copolymer in which the major component of the polymer chain is derived from a diolefin.

2. The composition of claim 1 in which the resin is polyethylene or polypropylene.

3. The composition of claim 2 in which the rubber is selected from the group consisting of polybutadiene rubber, natural or synthetic polyisoprene rubber, and copolymer rubber in which diene as the major component is copolymerized with styrene, vinyl pyridine, acrylonitrile or methacrylonitrile.

4. The composition of claim 3 in which (TS)$^2$/E is at least 50% more than that of a composition containing similar ingredients but comprising equal proportions of resin and vulcanized rubber in which the rubber is vulcanized to the same extent or more wherein TS is tensile strength and E is Young's modulus.

5. The composition of claim 4 having a Young's modulus of 1750 Kg./cm$^2$ or less.

6. The composition of claim 4 having a tensile strength of at least about 100% more than that of the corresponding composition containing unvulcanized rubber.

7. The composition of claim 3 which contains as an additional ingredient a rubber antidegradant in an amount of 0.1–5.0 parts by weight per 100 parts by weight rubber.

8. The composition of claim 4 in which the rubber is vulcanized to the extent either that the composition contains no more than four percent by weight of rubber extractable at room temperature or that the cross-link density determined on the same diene rubber as in the composition is greater than about $3 \times 10^{-5}$ moles per ml of rubber.

9. The composition of claim 4 in which the resin is polypropylene.

10. The composition of claim 9 in which the rubber is natural rubber.

11. The composition of claim 9 in which the rubber is polybutadiene rubber.

12. The composition of claim 4 in which the rubber is natural rubber and the resin is polyethylene.

13. The composition of claim 4 comprising a blend of about 30–40 parts by weight of resin and about 70–60 parts by weight of rubber.

14. The composition of claim 4 prepared by dynamic vulcanization.

15. A modified thermoplastic polyolefin resin comprising a blend of thermoplastic polyolefin resin and thermoplastic elastomeric composition of claim 1 in an amount so that the modified resin contains about 5 to 50 parts by weight of rubber per about 95 to 50 parts total weight of resin.

16. The resin of claim 15 in which the polyolefin resin is polypropylene.

17. The resin of claim 16 in which the rubber is natural rubber.

18. The resin of claim 16 in which the rubber is polybutadiene rubber.

19. The resin of claim 15 in which the rubber is natural rubber and the resin is polyethylene.

20. The resin of claim 15 in which the rubber is nitrile rubber and the resin is polyethylene.

* * * * *

UNITED STATES PATENT OFFICE
CERTIFICATE OF CORRECTION

PATENT NO. : 4,104,210
DATED : August 1, 1978
INVENTOR(S) : A. Y. Coran, B. Das, R. P. Patel It is certified that error appears in the above-identified patent and that said Letters Patent are hereby corrected as shown below:

On Title Page, under Inventors, one of the inventor's name was left off. Inventors should read:
Aubert Y. Coran, Balbhadra Das, and Raman P. Patel.

Column 2, line 2 [half] should read "that".

Column 3, line 5 [poit] should read "point".

Column 6, line 58 [and] should read "are".

Column 8, line 43 [nature] should read "natural".

Signed and Sealed this

Twenty-second Day of May 1979

[SEAL]

Attest:

RUTH C. MASON
Attesting Officer

DONALD W. BANNER
Commissioner of Patents and Trademarks